(12) United States Patent
Watanabe et al.

(10) Patent No.: US 10,231,042 B2
(45) Date of Patent: Mar. 12, 2019

(54) SPEAKER DEVICE

(71) Applicants: PIONEER CORPORATION, Kanagawa (JP); TOHOKU PIONEER CORPORATION, Yamagata (JP)

(72) Inventors: Kazuaki Watanabe, Yamagata (JP); Junichi Sato, Yamagata (JP); Susumu Miyata, Aichi (JP); Makoto Tsuruta, Aichi (JP)

(73) Assignees: PIONEER CORPORATION, Tokyo (JP); TOHOKU PIONEER CORPORATION, Yamagata (JP); ANDEN CO., LTD., Aichi (JP)

( * ) Notice: Subject to any disclaimer, the term of this patent is extended or adjusted under 35 U.S.C. 154(b) by 0 days.

(21) Appl. No.: 15/542,542

(22) PCT Filed: Jan. 9, 2015

(86) PCT No.: PCT/JP2015/050504
§ 371 (c)(1),
(2) Date: Jul. 10, 2017

(87) PCT Pub. No.: WO2016/111005
PCT Pub. Date: Jul. 14, 2016

(65) Prior Publication Data
US 2017/0374439 A1 Dec. 28, 2017

(51) Int. Cl.
*H04R 11/02* (2006.01)
*H04R 9/06* (2006.01)
(Continued)

(52) U.S. Cl.
CPC ............ *H04R 1/025* (2013.01); *B60Q 5/008* (2013.01); *H04R 7/12* (2013.01); *H04R 7/127* (2013.01);
(Continued)

(58) Field of Classification Search
CPC .......... H04R 1/02; H04R 1/021; H04R 1/023; H04R 1/025; H04R 1/026; H04R 1/028;
(Continued)

(56) References Cited

U.S. PATENT DOCUMENTS

| 3,095,941 A | * | 7/1963 | Hassan | H04R 7/20 181/157 |
| 4,759,069 A | * | 7/1988 | Bernstein | B60Q 5/00 324/76.31 |

(Continued)

FOREIGN PATENT DOCUMENTS

| JP | 03-104499 | 5/1991 |
| JP | 2002-374593 | 12/2002 |

(Continued)

OTHER PUBLICATIONS

International Search Report, PCT/JP2015/050504, dated Apr. 7, 2015.

*Primary Examiner* — Leshui Zhang
(74) *Attorney, Agent, or Firm* — Young & Thompson (57) ABSTRACT

Provided is a speaker device in which reproduction sound pressure is increased, and heat resistance and water resistance are improved. The speaker device includes: a diaphragm formed of a film containing polyimide; and a frame for supporting the diaphragm. A cross-section passing the center of the diaphragm and parallel to a sound emission direction includes sequentially from an inner periphery to an outer periphery of the diaphragm along the sound emission direction: a first bent plate portion having a concave arc; a second bent plate portion having a convex arc; a third bent plate portion having a concave arc; and a fourth bent plate portion having a convex arc. An area of the first bent plate portion is larger than any of areas of the second, the third, the fourth bent plate portions.

8 Claims, 8 Drawing Sheets

(51) Int. Cl.
*H04R 1/02* (2006.01)
*H04R 7/12* (2006.01)
*H04R 7/18* (2006.01)
*B60Q 5/00* (2006.01)
*H04R 9/02* (2006.01)

(52) U.S. Cl.
CPC ............... *H04R 7/18* (2013.01); *H04R 9/025* (2013.01); *H04R 9/06* (2013.01); *H04R 2400/11* (2013.01); *H04R 2499/13* (2013.01)

(58) Field of Classification Search
CPC .......... H04R 7/12; H04R 7/122; H04R 7/125; H04R 7/127; H04R 7/14; H04R 7/16; H04R 7/18; H04R 7/20; H04R 7/22; H04R 7/24; H04R 7/26; H04R 9/025; H04R 9/06; H04R 9/063; H04R 9/066; H04R 7/02; B60Q 5/006
USPC ......... 381/86, 332, 333, 334, 335, 336, 348, 381/346, 353, 354, 160, 162, 165, 372, 381/184, 186, 385, 386, 387, 388, 389, 381/395, 191, 398, 405, 404, 403, 407, 381/411, 417, 418, 423, 432, 430; 181/148, 151, 152, 153, 154, 155, 156, 181/157, 163, 164, 165, 166, 171, 172, 181/173, 174

See application file for complete search history.

(56) References Cited

U.S. PATENT DOCUMENTS

| | | |
|---|---|---|
| 2003/0002695 A1 | 1/2003 | Takahashi et al. |
| 2007/0041607 A1 | 2/2007 | Abe |
| 2007/0127768 A1* | 6/2007 | Horigome ................ H04R 9/06 381/423 |
| 2007/0160258 A1* | 7/2007 | Mimura ............. C08G 73/1071 381/423 |
| 2011/0299718 A1 | 12/2011 | Williamson |
| 2012/0033843 A1* | 2/2012 | Ouweltjes .............. H04R 9/022 381/349 |

FOREIGN PATENT DOCUMENTS

| | | |
|---|---|---|
| JP | 2004-136831 | 5/2004 |
| JP | 2007-060024 | 3/2007 |
| JP | 2007-142982 | 6/2007 |
| JP | 2010-258538 | 11/2010 |
| JP | 2013-531430 | 8/2013 |
| JP | 5400246 | 1/2014 |

* cited by examiner

SPEAKER DEVICE

TECHNICAL FIELD

This invention relates to a speaker device.

BACKGROUND ART

A hybrid vehicle or an electric vehicle is very silent while running. When such a vehicle approaches a passenger such as a pedestrian, the passenger may not notice its approach. Therefore, various speaker devices mounted on a hybrid vehicle or the like for generating a warning sound to warn a passenger about an approach of the hybrid vehicle or the like have been proposed (for example, refer to PTL 1). Each manufacturer uniquely determines specifications of such a speaker device, and for example, the speaker devices are not designed based on a unified standard regarding such as heat resistance and environment resistance.

CITATION LIST

Patent Literature

Patent Literature 1: JP 2004-136831 A

SUMMARY OF INVENTION

Technical Problem

In the meantime, there is a trend that mounting methods and specifications of a speaker device for a warning sound will be legislated these days. Further, because the speaker device is mounted near an engine or a motor of a hybrid vehicle or the like, such a speaker device needs reproduction sound pressure by frequency, and environment resistance such as heat resistance, humidity resistance, and water resistance.

Accordingly, an example of a problem to be solved by the present invention is to provide a speaker device in which reproduction sound pressure is increased, and heat resistance and water resistance are improved.

Solution to Problem

For solving the problem, there is provided a speaker device according to a first aspect of the present invention including:
  a diaphragm formed of a film containing polyimide; and
  a frame for supporting the diaphragm,
  wherein a cross-section passing the center of the diaphragm and parallel to a sound emission direction includes sequentially from an inner periphery to an outer periphery of the diaphragm along the sound emission direction:
    a first bent plate portion having a concave arc;
    a second bent plate portion having a convex arc;
    a third bent plate portion having a concave arc; and
    a fourth bent plate portion having a convex arc,
  wherein an area of the first bent plate portion is larger than any of areas of the second, the third, the fourth bent plate portions.

DESCRIPTION OF EMBODIMENTS

Hereinafter, a speaker device according to one embodiment of the present invention will be explained. A speaker device according to one embodiment of the present invention includes: a diaphragm formed of a film containing polyimide; and a frame for supporting the diaphragm, in which a cross-section passing the center of the diaphragm and parallel to a sound emission direction includes sequentially from an inner periphery to an outer periphery of the diaphragm along the sound emission direction: a first bent plate portion having a concave arc; a second bent plate portion having a convex arc; a third bent plate portion having a concave arc; and a fourth bent plate portion having a convex arc, in which an area of the first bent plate portion is larger than any of areas of the second, the third, the fourth bent plate portions.

In a speaker device mounted on a vehicle for generating a warning sound to warn a passenger about an approach of the vehicle, a situation where high-pressure water stream from outside of the vehicle may hit a diaphragm is supposed. Therefore, the diaphragm needs water resistance with respect to strength able to resist pressure of such water stream. According to the speaker device of this embodiment, because the diaphragm is formed of a film containing polyimide, the heat resistance and the water resistance are improved. Further, a cross-section passing the center of the diaphragm and parallel to the sound emission direction of every bent plate portion including the first bent plate portion having a largest area in a plan view and receiving the highest pressure of the water stream has an arc. Such an arc has a structure dynamically equable at any portions. Therefore, a force inside of the diaphragm generated by the water pressure around the diaphragm acts evenly on the bent plate portions of the diaphragm, and consequently the force can be dispersed. Therefore, this diaphragm has improved water resistance with respect to strength above to resist pressure of such water stream. Specifically, as an example, the first, the second, the third, and the fourth bent plate portions are partially hard to be deformed by specific pressure of the water stream, and even if deformed temporarily, they can return to predetermined shapes.

Here, because a shape of the cross-section parallel to the sound emission direction of the first bent plate portion mainly working as sound emitter in the diaphragm is a concave arc with respect to the sound emission direction, high-frequency oscillation of a voice coil transmits to the first bent plate portion with difficulty, and high frequency sound is produced with difficulty. However, the above warning sound needs mainly low frequency sound. Further, according to this embodiment, owing to the above shape of the first bent plate portion, the water resistance with respect to strength is improved. Further, in the diaphragm, because the shapes of the cross-sections of the second, the third, and the fourth bent plate portions positioned outer peripheral side of the first bent plate portion and working also as edge are arcs as above, the water resistance with respect to strength is improved.

In this way, in the speaker device of this embodiment, improvements of the heat resistance and the water resistance are realized.

Further, in a speaker device according to one embodiment of the present invention, curvature radius of the arc of the first bent plate portion is larger than curvature radius of the arc of the third bent plate portion. Further, curvature radius of the arc of the fourth bent plate portion is smaller than curvature radius of the arc of the second bent plate portion. Namely, in this speaker, curvature radius of the arc of the first bent plate portion working as sound emitter is larger than curvature radius of the arc of the third bent plate portion working also as edge. Further, curvature radius of the arc of the second bent plate portion is smaller than curvature radius of the arc of the third bent plate portion. In the diaphragm of this speaker device, curvature radius of the arc of the second bent plate portion positioned near the first bent plate portion and near an inner periphery of the edge is smaller than curvature radius of the arc of the third bent plate portion positioned around the center of the edge in a width direction.

Owing to this, the lowest resonance frequency can be close to a desired frequency, for example, 300 Hz. Further, anti-resonance frequency can be set, for example, more than 5 kHz, and a large dip cannot emerge in a frequency range less than 5 kHz.

Further, in the speaker device according to one embodiment of the present invention described above, the diaphragm includes: the second bent plate portion consisting of a cross-section of a convex arc; the third bent plate portion consisting of a cross-section of a concave arc; and the fourth bent plate portion consisting of a cross-section of a convex arc. Cross-sections passing the center of the diaphragm and parallel to a sound emission direction of the second, the third, and the fourth bent plate portions are all arc shapes. Such an arc has a structure dynamically equable at any portions. Therefore, a force inside of the diaphragm generated by the water pressure around the diaphragm acts evenly on the bent plate portions of the diaphragm, and consequently the force can be dispersed. Namely, according to the above speaker device, the water resistance with respect to strength is further improved and able to resist pressure of such water stream. Specifically, as an example, the second, the third, and the fourth bent plate portions are partially hard to be deformed by specific pressure of the water stream, and even if deformed temporarily, they can return to predetermined shapes.

Further, in the speaker device according to one embodiment of the present invention, an opening is provided in the center of the first bent plate portion and is covered with a cap. Further, a cross-section of the cap passing the center of the diaphragm and parallel to the sound emission direction is a concave arc. Such an arc has a structure dynamically equable at any portions. Therefore, a force inside of the cap generated by the water pressure around the cap acts evenly on the portions of the cap, and consequently the force can be dispersed. Namely, according to the above speaker device, the water resistance with respect to strength is further improved and able to resist pressure of such water stream. Specifically, as an example, the cap is partially hard to be deformed by specific pressure of the water stream, and even if deformed temporarily, it can return to a predetermined shape.

Further, in a speaker device provided with a cap of which cross-section is an arc, the cap is formed of a film containing polyimide. Thereby, the heat resistance and the water resistance of the cap are further improved.

Further, in the speaker device provided with the cap of which cross-section is an arc, curvature radius of the arc of the cap is smaller than curvature radius of the arc of the first bent plate portion. As the curvature radius of the arc of the cap is smaller, mechanical strength is higher.

Further, in the speaker device according to one embodiment of the present invention, the diaphragm has a thickness of any of 50 μm, 75 μm, 100 μm, and 125 μm. Thicknesses of the general-purpose products of the polyimide film are 50 μm, 75 μm, 100 μm, 125 μm, and the like. Because the thickness of the diaphragm is the above thickness, the general-purpose products of the polyimide film can be used as is, and the production cost of the speaker device can be reduced.

Further, in the speaker device according to one embodiment of the present invention, the diaphragm has a thickness of 125 μm. Because the thickness of the diaphragm is as such, while the production cost of the speaker device is reduced, the heat resistance and the water resistance with respect to high strength are maintained, and the diaphragm can be light-weighted.

Further, in the speaker device according to one embodiment of the present invention described above, the diaphragm is arranged in a vehicle, and generates a warning sound to warn an approach of the vehicle toward an outside of the vehicle. Such a speaker device for a warning sound needs high reproduction sound pressure, high heat resistance, and high water resistance. This speaker device has the high reproduction sound pressure, the high heat resistance, and the high water resistance described above.

Embodiment (First Embodiment)

Figure 1:
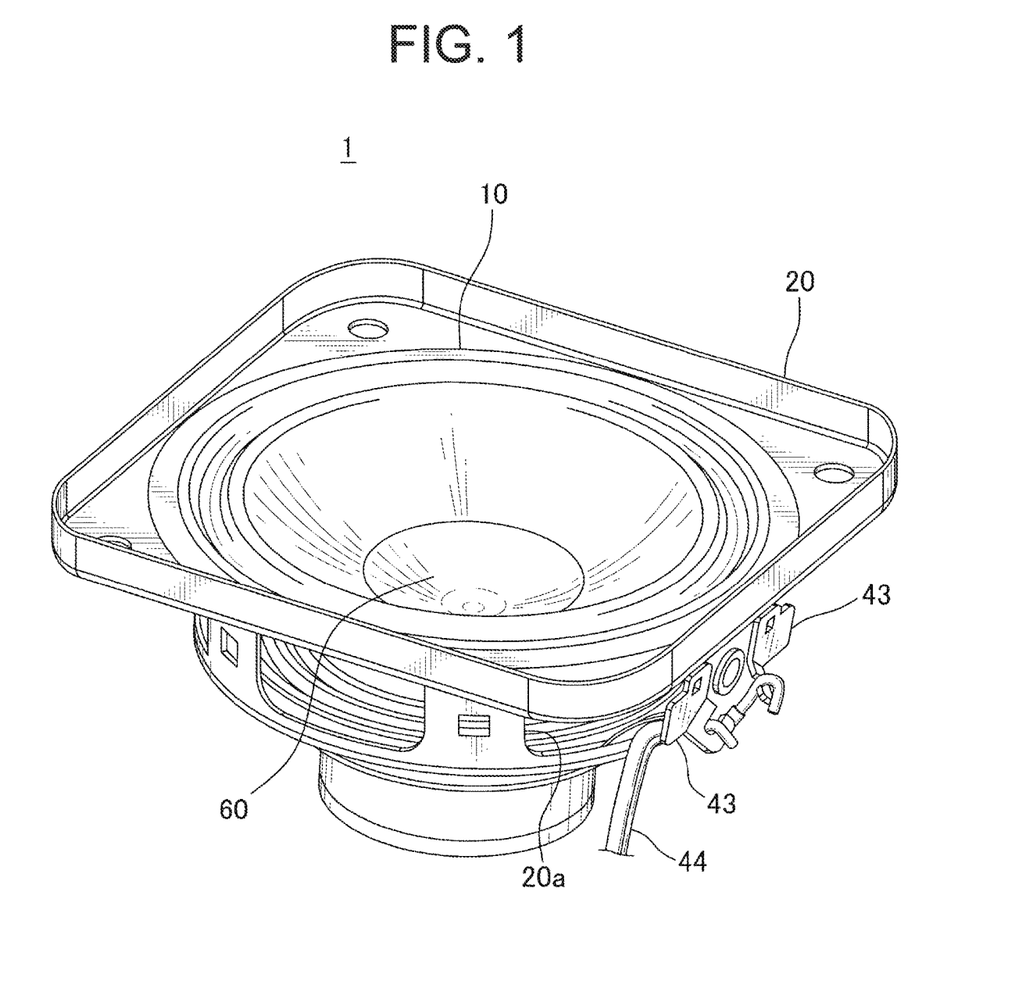
FIG. 1 is a perspective view of a speaker device according to a first embodiment of the present invention seeing from a place receiving sound emission.
Figure 2:
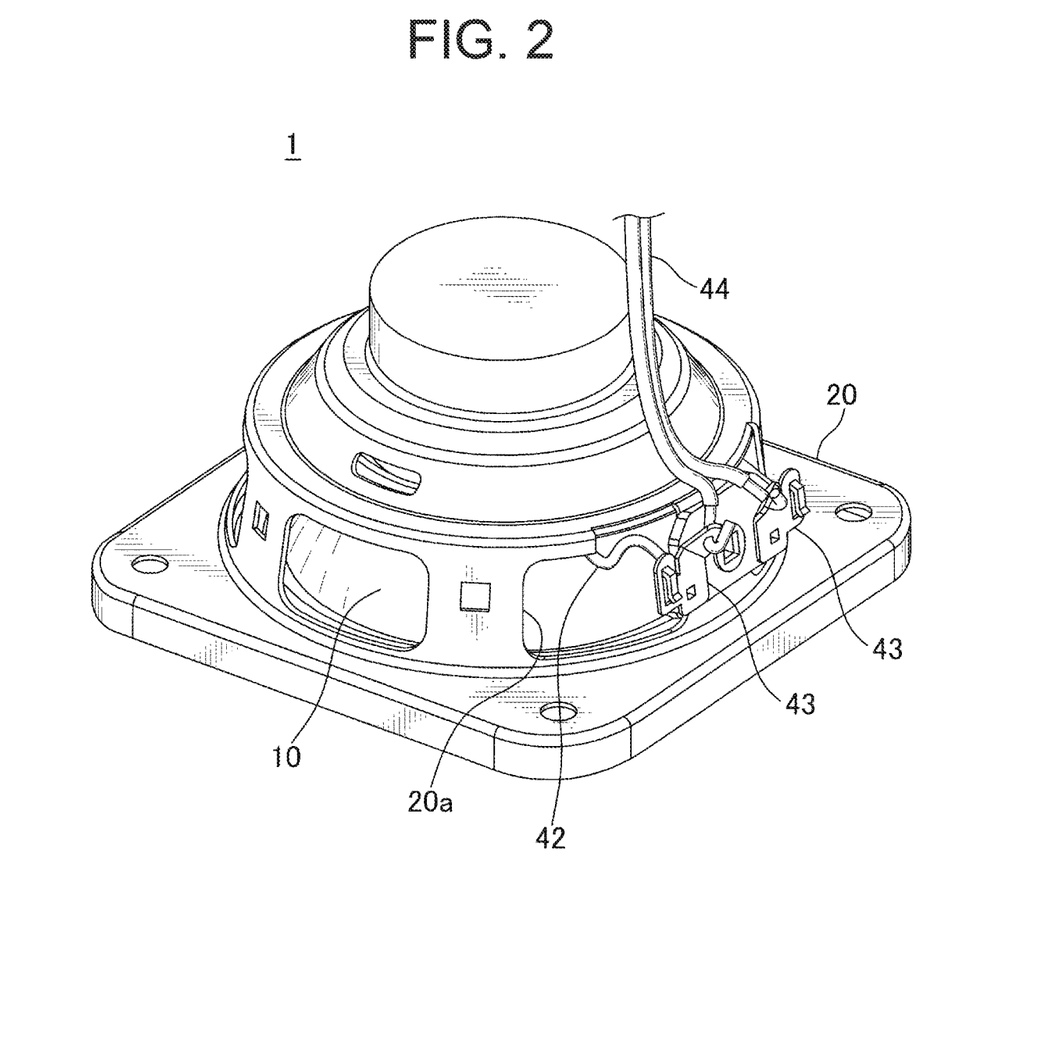
FIG. 2 is a perspective view of the speaker device shown in FIG. 1 seeing from a rear side with respect to the place receiving the sound emission.
Figure 3:
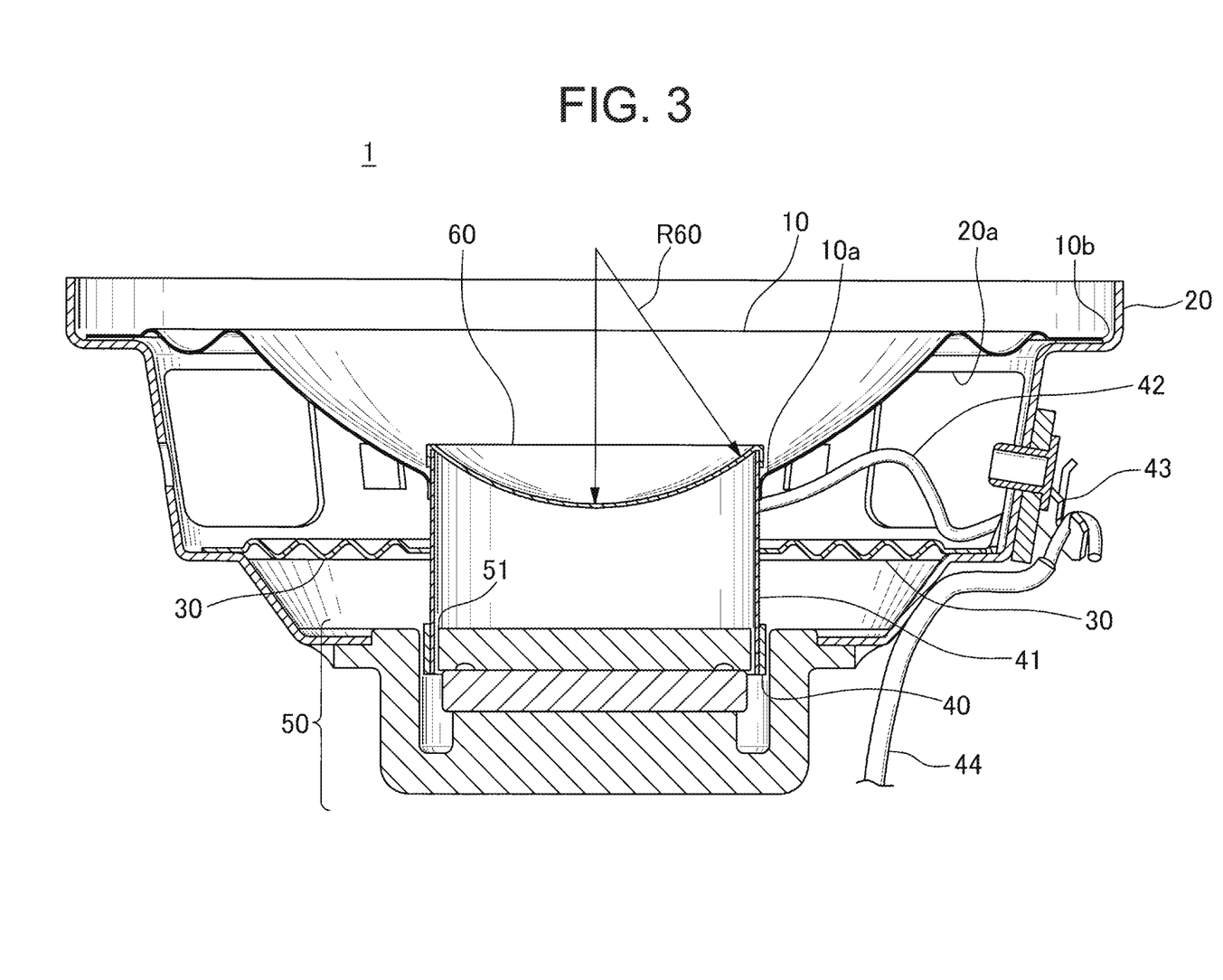
FIG. 3 is a sectional view of a cross-section along a sound emission direction of the speaker device shown in FIG. 1.
Figure 4:
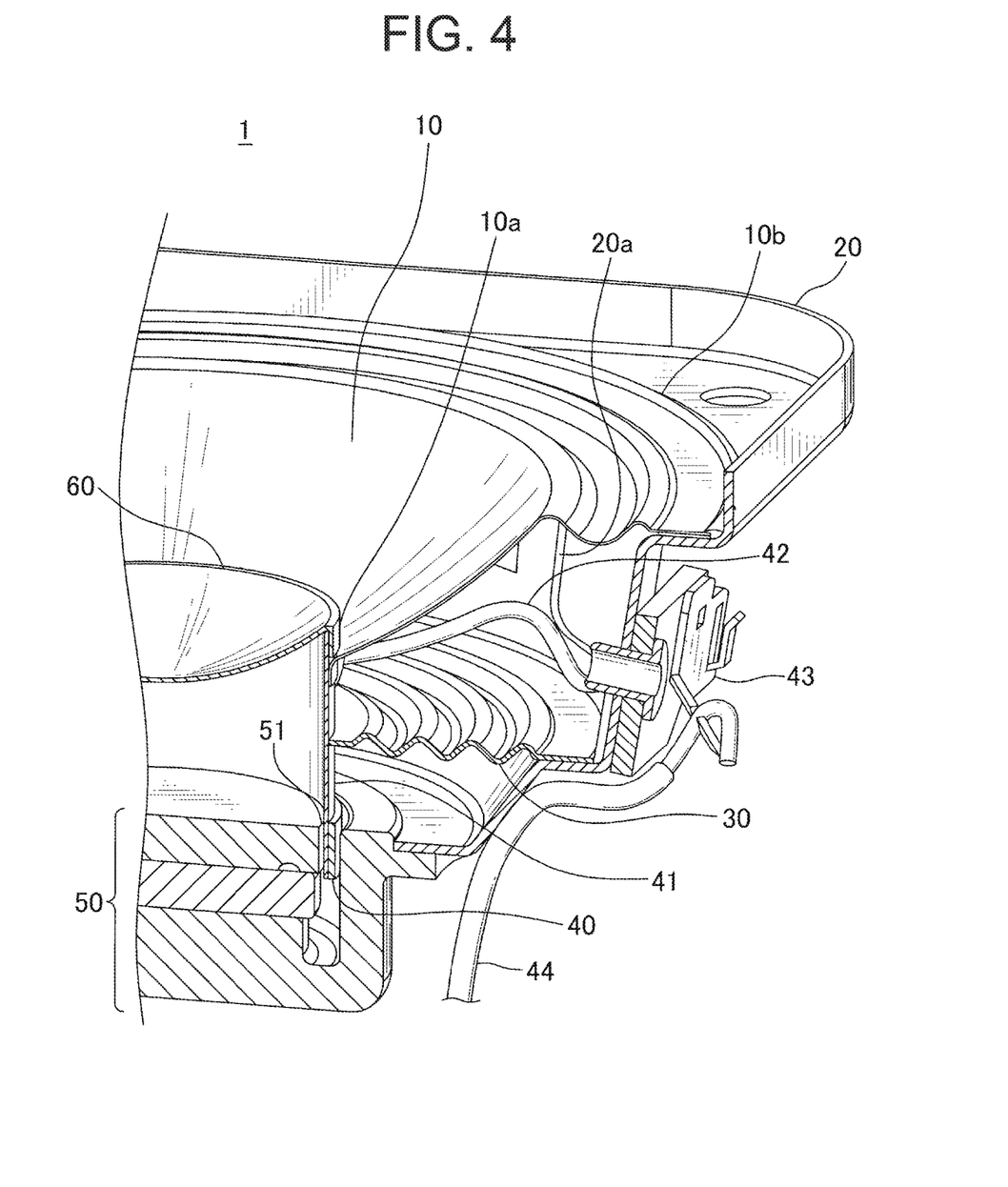
FIG. 4 is a partially sectional perspective view of the speaker device shown in FIG. 1 showing the cross-section of FIG. 3 by cutting.

A speaker device according to a first embodiment of the present invention will be explained with reference to figures. FIG. 1 is a perspective view of a speaker device according to the first embodiment of the present invention seeing from a place receiving sound emission. FIG. 2 is a perspective view of the speaker device shown in FIG. 1 seeing from a rear side with respect to the place receiving the sound emission. FIG. 3 is a sectional view of a cross-section along a sound emission direction of the speaker device shown in FIG. 1. FIG. 4 is a partially sectional perspective view of the speaker device shown in FIG. 1 showing the cross-section of FIG. 3 by cutting.

A speaker device 1 according to this embodiment is mounted on a vehicle being silent while running such as a hybrid vehicle or an electric vehicle, and generates a waring sound to warn an approach of the vehicle to a passenger.

The speaker device 1 includes: a diaphragm 10; a frame 20; a damper 30; a voice coil 40; a magnetic circuit 50; and a cap 60. The diaphragm 10 is a diaphragm of which outer peripheral shape is circular, and provided with an opening 10 in the center thereof. A neighborhood of an outer peripheral edge 10b of the diaphragm 10 is coupled and supported by a tubular frame 20, and a neighborhood of an inner peripheral edge of the opening 10a in the diaphragm 10 is coupled and supported by a peripheral wall near an upper edge of a cylindrical voice coil bobbin 41. The upper edge of the voice coil bobbin 41 is projected slightly from the opening 10a to the sound emission direction. The opening 10a is covered with the cap 60 overlaying the upper edge of this voice coil bobbin 41.

The damper 30 is a flexible annular member, of which outer peripheral edge is coupled and supported by the frame 20, and of which inner peripheral edge is coupled and supported by the peripheral wall of the voice coil bobbin 41. The voice coil 40 is formed around the peripheral wall of the voice coil bobbin 41, and arranged inside of a magnetic gap 51 of the magnetic circuit 50. Further, the voice coil 40 is connected to an outer wiring 44 via an inner wiring 42 and a wiring terminal 43. The wiring terminal 43 is fixed to an outer wall of the frame 20. One end of the inner wiring 42 is connected to the voice coil 40 and arranged inside of the frame 20, and the other end of the inner wiring 42 is connected to the wiring terminal 43 through the opening 20a of the frame 20. Further, one end of the outer wiring 44 is connected to this wiring terminal 43.

When a sound signal is supplied to the voice coil 40 via the outer wiring 44 and the inner wiring 42, the voice coil 40 is oscillated by Lorentz force affected from the magnetic circuit 50, its oscillation is transmitted to the diaphragm 10, and the diaphragm 10 emits sound.

Figure 5:
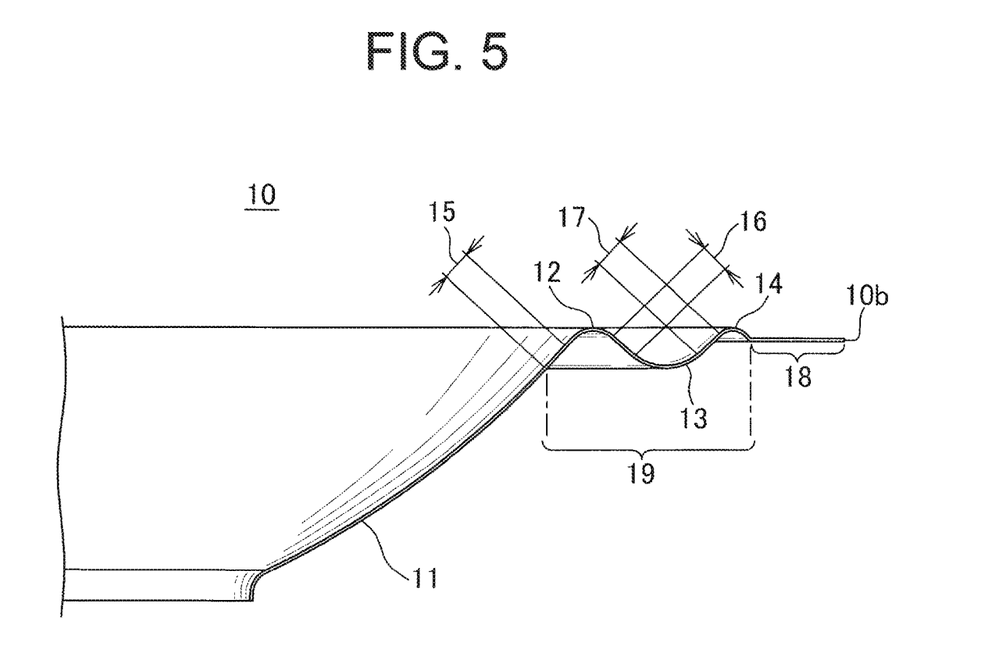
FIG. 5 is a partially sectional view showing a right half of the cross-section of a diaphragm shown in FIG. 3.
Figure 6:
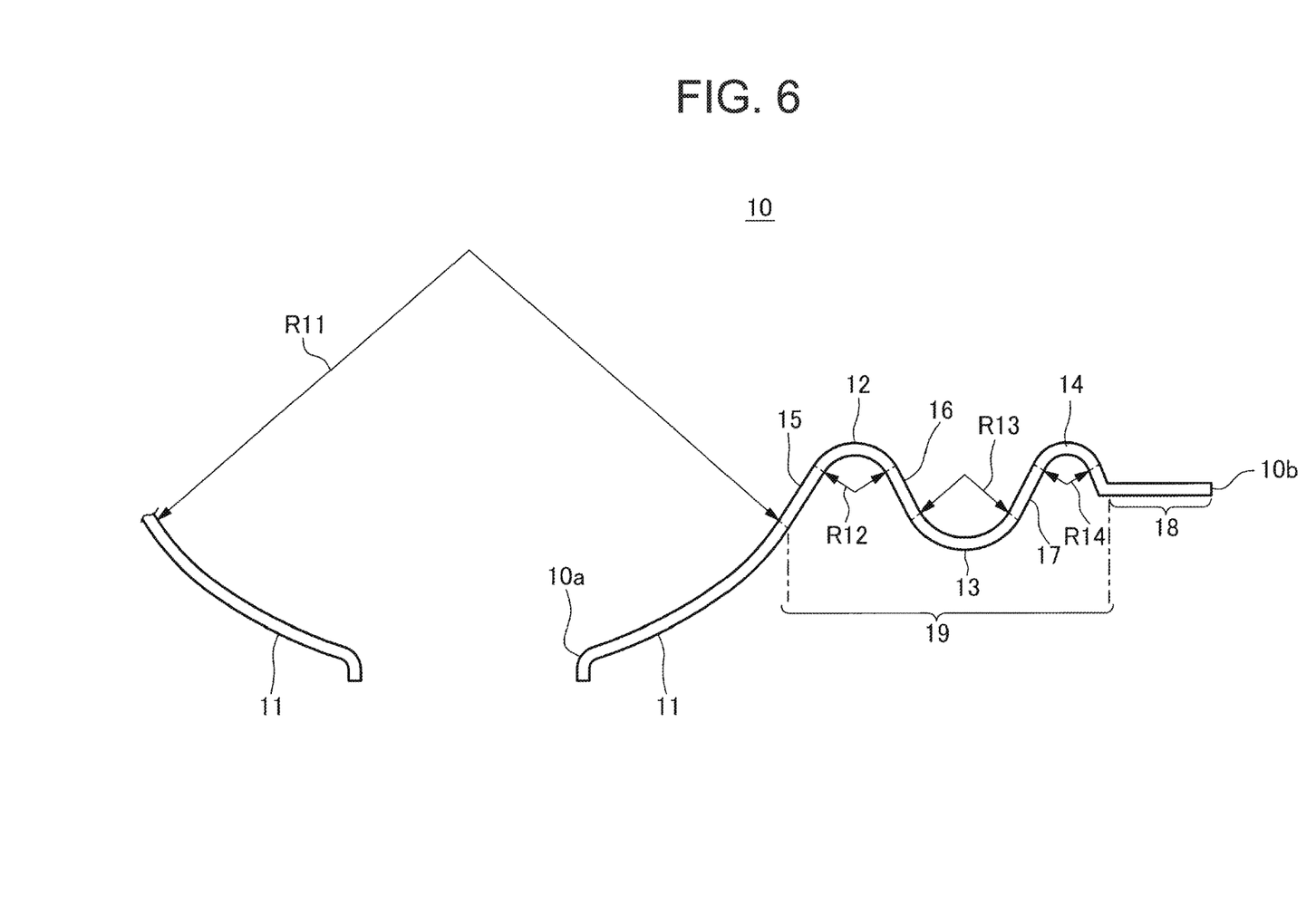
FIG. 6 is a schematic view of the cross-section of the diaphragm shown in FIG. 5.

Here, in this embodiment, the diaphragm 10 has a shape as follows. FIG. 5 is a partially sectional view showing a right half of the cross-section of a diaphragm shown in FIG. 3. FIG. 6 is a schematic view of the cross-section of the diaphragm shown in FIG. 5.

The diaphragm 10 has a first bent plate portion 11, a second bent plate portion, a third bent plate portion, and a fourth bent plate portion.

The first bent portion 11 is positioned in the center of the diaphragm 10, and a cross-section parallel to the sound emission direction is a concave arc along the sound emission direction. The first bent plate portion 11 is a ring shape having the opening 10a in the center thereof when seeing from the sound emission direction.

Incidentally, in this embodiment, the arc shape of the cross-section of the first bent plate portion 11 is included in a bowl shape as a whole made by connecting the arc shape shown in the right half with an arc shape not shown in the left half. However, the arc shape of the cross-section of the first bent plate portion according to the present invention is not limited to the arc shape of such a bowl shape. The arc shape of the cross-section of the first bent plate portion according to the present invention may be included in, for example, W-shaped cross-section composed of two arcs as a whole as far as a cross-section of a half part extending from the center to the outer periphery of the first bent plate portion has an arc shape.

The second bent plate portion 12 is positioned at an outer peripheral side of the first bent plate portion 11, and of which cross-section parallel to the sound emission direction is a convex arc along the sound emission direction. The second bent plate portion 12 has a ring shape when seeing from the sound emission direction. The third bent plate portion 13 is positioned at an outer peripheral side of the second bent plate portion 12, and of which cross-section parallel to the sound emission direction is a concave arc along the sound emission direction. The third bent plate portion 13 has a ring shape when seeing from the sound emission direction. The fourth bent plate portion 14 is positioned in between the outer peripheral side of the third bent plate portion 13 and the outer peripheral edge 10b of the diaphragm 10, and of which cross-section parallel to the sound emission direction is a convex arc along the sound emission direction. The fourth bent plate portion 14 has a ring shape when seeing from the sound emission direction. Further, an area in a plan view of the first bent plate portion 11 is larger than any of the second bent plate portion 12, the third bent plate portion 13, and the fourth bent plate portion 14. In the diaphragm 10, the first bent plate portion 11 works mainly as sound emitter. Further, a portion 19 positioned at an outer peripheral side of the first bent plate portion 11, and having the second bent plate portion 12, the third bent plate portion 13, and the fourth bent plate portion 14 works mainly as edge.

Further, in this embodiment, an outer peripheral edge of the first bent plate portion 11 and an inner peripheral edge of the second bent plate portion 12 are connected by a first slope portion 15 of which cross-section parallel to the sound emission direction is straight. Further, an outer peripheral edge of the second bent plate portion 12 and an inner peripheral edge of the third bent plate portion 13 are connected by a second slope portion 16 of which cross-section parallel to the sound emission direction is straight. Further, an outer peripheral edge of the third bent plate portion 13 and an inner peripheral edge of the fourth bent plate portion 14 are connected by a third slope portion 17 of which cross-section parallel to the sound emission direction is straight. Further, a portion from an outer peripheral edge of the fourth bent plate portion 14 to the outer peripheral edge 10b of the diaphragm 10 is a flat ring portion 18 which is straight substantially perpendicular to the sound emission direction. When the flat ring portion 18 is laminated on and attached to an upper face of the frame 20, a neighbor of the outer peripheral edge 10b of the diaphragm 10 is coupled to and supported by the frame 20. The flat ring portion 18 is an attachment margin with respect to the frame 20.

In the speaker device 1 of this embodiment mounted on a vehicle for generating a warning sound to warn a passenger about an approach of the hybrid vehicle, because it is supposed that high pressure water stream from an outside of the vehicle may hit the diaphragm 10, the diaphragm 10 needs water resistance with respect to strength able to resist pressure of such water stream. According to the speaker device 1 of this embodiment, because the diaphragm 10 is formed of a film containing polyimide, the heat resistance and the water resistance are improved. Further, the cross-sections parallel to the sound emission direction of the bent plate portions 11 to 14 including the first bent plate portion 11 having the largest area in plan view and receiving the water stream pressure mostly are all arcs. Such an arc has a structure dynamically equable at any portions. Therefore, a force inside of the diaphragm generated by the water pressure around the diaphragm acts evenly on the bent plate portions of the diaphragm, and consequently the force can be dispersed. Thereby, in the speaker device 1 of this embodiment, the water resistance with respect to strength is further improved and able to resist pressure of such water stream. Specifically, as an example, the cap is partially hard to be deformed by specific pressure of the water stream, and even if deformed temporarily, it can return to a predetermined shape.

Here, because a shape of the cross-section parallel to the sound emission direction of the first bent plate portion 11 mainly working as sound emitter in the diaphragm 10 is a concave arc with respect to the sound emission direction, high-frequency oscillation of a voice coil transmits to the first bent plate portion 11 with difficulty, and high frequency sound is produced with difficulty. However, the above warning sound needs mainly low frequency sound, for example less than 5 kHz. Further, in this embodiment, owing to the above shape of the first bent plate portion 11, the water resistance with respect to strength is improved. Further, in the diaphragm 10, because the shapes of the cross-sections of the second, the third, and the fourth bent plate portions 12 to 14 positioned outer peripheral side of the first bent plate portion 11 and working also as edge are arcs as above, the water resistance with respect to strength is improved.

Figure 7:
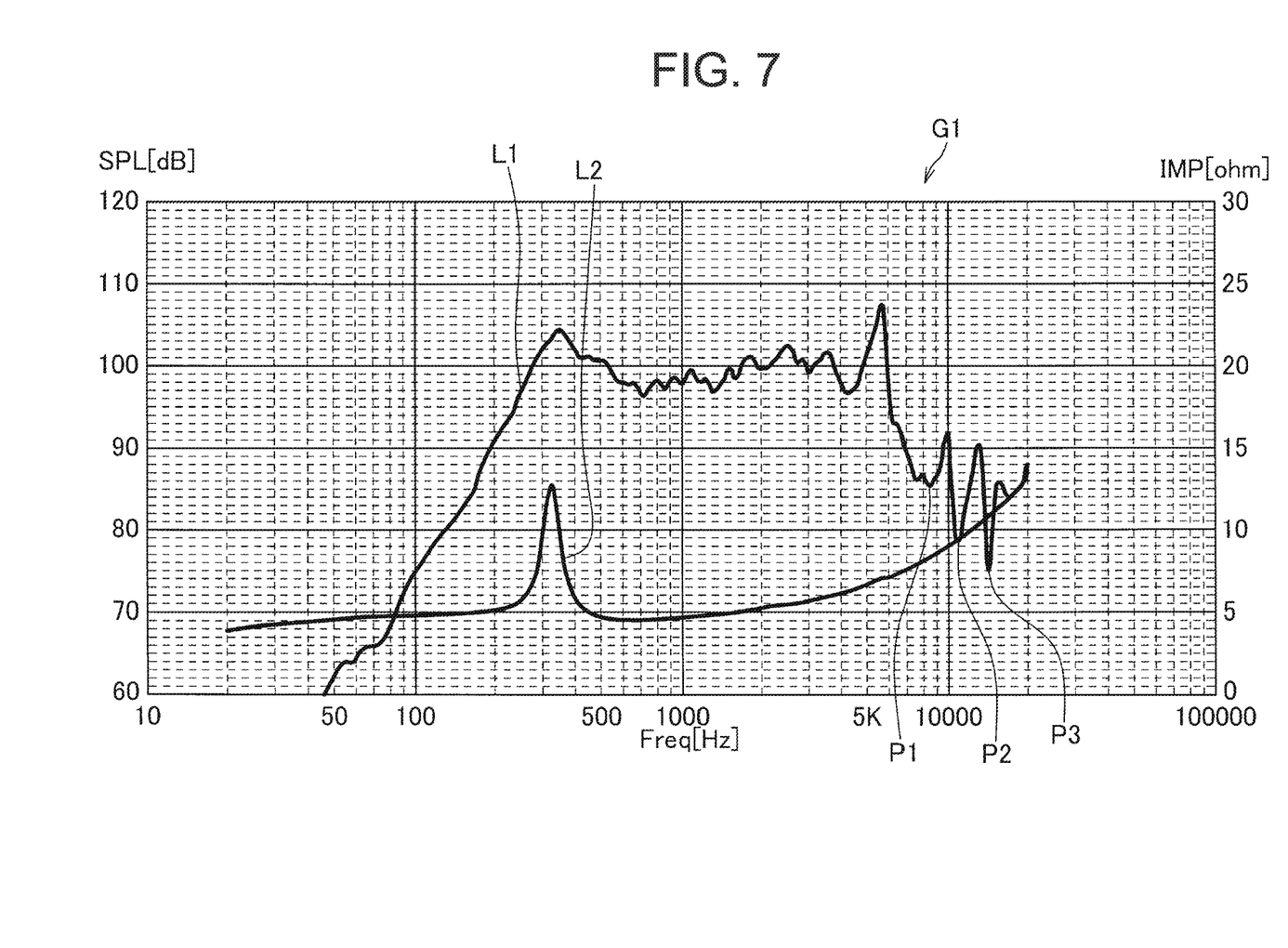
FIG. 7 is a graph showing frequency characteristics of reproduction sound pressure and impedance of the speaker device shown in FIG. 1.

FIG. 7 is a graph showing frequency characteristics of reproduction sound pressure and impedance of the speaker device shown in FIG. 1. In the graph G1 of FIG. 7, the horizontal axis indicates the frequency [Hz], the vertical axis at left side in FIG. 7 indicates the reproduction sound pressure [dB], and the vertical axis at right side in FIG. 7 indicates the impedance [ohm]. Then, the sound pressure curve L1 showing the frequency characteristics of the reproduction sound pressure, and the impedance curve L2 showing the frequency characteristics of the impedance are described on this graph G1. Incidentally, the sound pressure curve L1 is attained by plotting the measurement result of measuring the sound pressure at the point 1 meter away from the diaphragm 10 when supplying the acoustic signal of 20 W to the speaker device 1 while changing the frequency. As known by the sound pressure curve L1, in the speaker device 1 of this embodiment, the sound pressure is high with regard to the low frequency sound less than 5 kHz.

In this way, in the speaker device 1 of this embodiment, the high reproduction sound pressure and the improvements of the heat resistance and the water resistance are realized.

Here, as shown in FIG. 6, in the speaker device 1 of this embodiment, the curvature radius R11 of the arc of the first bent plate portion 11 is larger than the curvature radius R13 of the arc of the third bent plate portion 13, and the curvature radius R14 of the arc of the fourth bent plate portion 14 is smaller than the curvature radius R12 of the arc of the second bent plate portion 12. Namely, in this speaker device 1, the curvature radius R11 of the arc of the first bent plate portion 11 working as sound emitter is larger than the curvature radius R13 of the arc of the third bent plate portion 13 positioned around the center of the edge in a width direction.

Further, the curvature radius R14 of the arc of the fourth bent plate portion 14 positioned closest to the frame 20 is smaller than the curvature radius R12 of the arc of the second bent plate portion 12. As a result, in the speaker device 1, the lowest resonance frequency can be close to a desired frequency, for example, 300 Hz. Further, anti-resonance frequency can be set, for example, more than 5 kHz, and a large dip cannot emerge in a frequency range less than 5 kHz.

As known by the sound pressure curve L1 in the graph G1 of FIG. 7, in the speaker device 1 of this embodiment, the local minimum points P1, P2, and P3 appear in the higher frequency side than 5 kHz which is often needed as the above warning sound. In this way, according to the speaker device 1 of this embodiment, the reproduction sound pressure of the desired low frequency sound is prevented from being reduced.

Further, in the speaker device 1 of this embodiment, the curvature radius R12 of the arc of the second bent plate portion 12 is smaller than the curvature radius R13 of the arc of the third bent plate portion 13. Owing to this structure, in this embodiment, the above anti-resonance frequencies (the local minimum points P1, P2, and P3 of the sound pressure in the graph of FIG. 7) are shifted to the high frequency side.

Further, in the speaker device 1 of this embodiment, the opening 10a is provided in the center of the first bent portion 11, and covered with the cap 60 as shown in FIGS. 1, 3, and 4. Further, a cross-section parallel to the sound emission direction of this cap 60 is a concave arc along the sound emission direction. Such an arc has a structure dynamically equable at any portions. Therefore, a force inside of the cap 60 generated by the water pressure around the cap 60 acts evenly on the portions of the cap 60, and consequently the force can be dispersed. Namely, according to this speaker device 1, the water resistance with respect to strength is further improved and able to resist pressure of such water stream. Specifically, as an example, the cap 60 is partially hard to be deformed by specific pressure of the water stream, and even if deformed temporarily, it can return to a predetermined shape.

Further, in the speaker device 1 of this embodiment, the cap 60 is also formed of a film containing polyimide. Thereby, the heat resistance and the water resistance of the cap 60 are further improved.

Further, in the speaker device 1 of this embodiment, the curvature radius R60 (FIG. 3) of the arc of the cap 60 is smaller than the curvature radius R11 of the arc of first bent plate portion 11. The dynamic strength of the cap 60 having the smaller curvature radius is greater.

Further, the diaphragm 10 has a thickness of any of 50 μm, 75 μm, 100 μm, and 125 μm. Thicknesses of the general-purpose products of the polyimide film are 50 μm, 75 μm, 100 μm, 125 μm, and the like. Because the thickness of the diaphragm is the above thickness and the general-purpose products of the polyimide film can be used as is, while the production cost of the speaker device is reduced, the heat resistance and the water resistance are maintained, and the characteristics such as minimum resonance frequency can be optimized.

Further, the diaphragm 10 having the thickness of 125 μm among the above thicknesses is further preferable. Because the thickness of the diaphragm 10 is as such, while the production cost of the speaker device is reduced, the reproduction sound pressure, the heat resistance, and the water resistance are maintained, and the speaker device 1 can be light-weighted.

Further, in this embodiment, the speaker device 1 is applied to the speaker device mounted on a vehicle being silent while running, and generating a waring sound to warn an approach of the vehicle to a passenger. Namely, in the speaker device 1 of this embodiment, the diaphragm 10 is arranged in a vehicle, and generates a warning sound to warn an approach of the vehicle to an outside of the vehicle. Such a speaker device for warning sound needs high reproduction sound pressure, high heat resistance, and high water resistance. The speaker device 1 of this embodiment has high reproduction sound pressure, high heat resistance, and high water resistance as described above.

(Second Embodiment)

Next, a speaker device according to a second embodiment of the present invention will be explained. The second embodiment is the same as the first embodiment other than a shape of the diaphragm. So, hereinafter the difference between the first and second embodiments will be focused and explained, and an explanation of the common points such as a configuration of the speaker device will be omitted.

Figure 8:
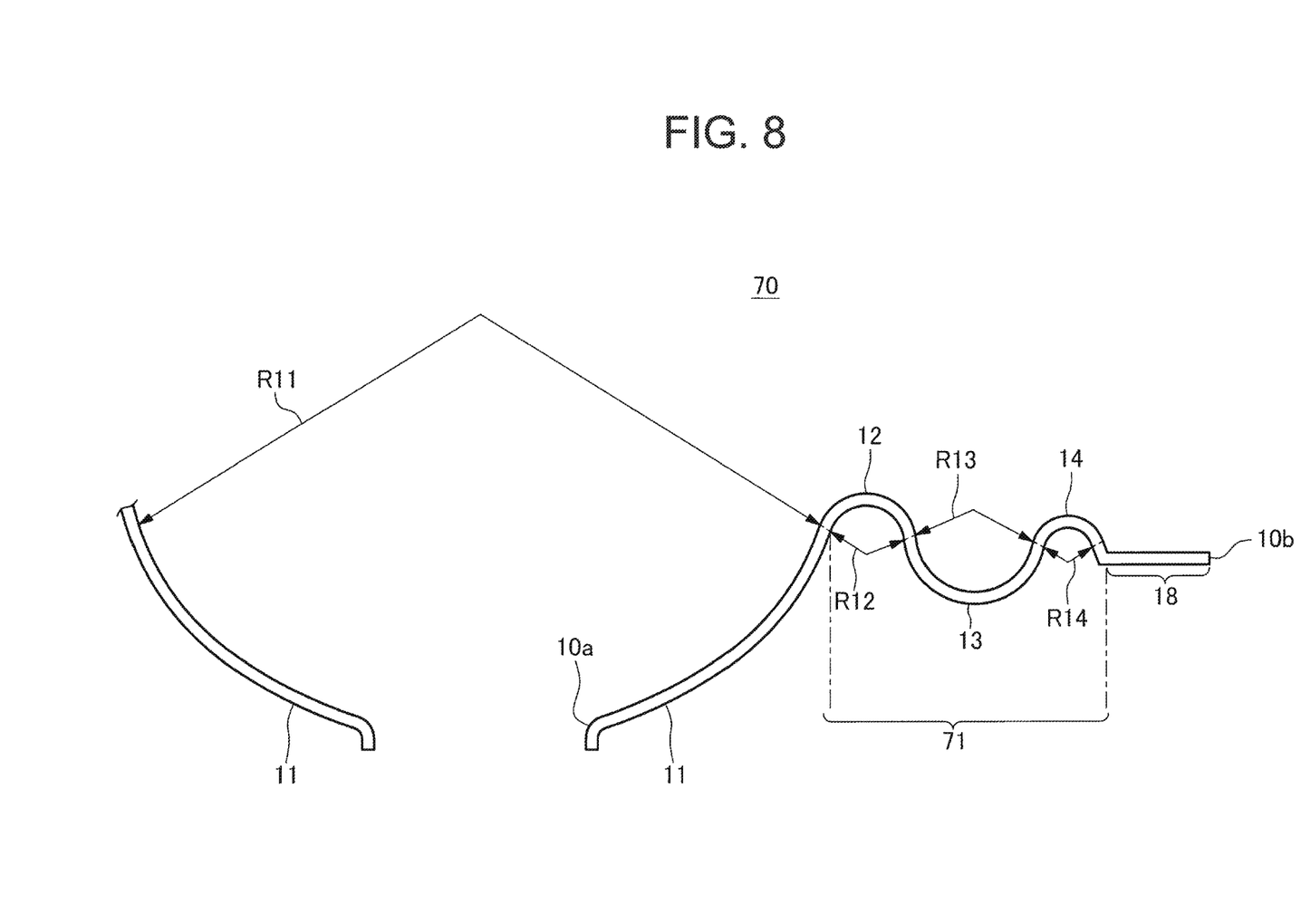
FIG. 8 is a sectional view of a cross-section of a diaphragm according to a second embodiment of the present invention along a sound the emission direction.

FIG. 8 is a sectional view of a cross-section of a diaphragm according to the second embodiment of the present invention along the sound the emission direction. In FIG. 8, the components similar to the components of the diaphragm 10 of the first embodiment shown in FIG. 6 are denoted by the same reference signs as FIG. 6, and hereinafter redundant explanations of the similar components will be omitted.

A cross-section passing the center of the diaphragm 70 and parallel to the sound emission direction includes sequentially from an inner periphery to an outer periphery of the diaphragm 70 along the sound emission direction: a second bent plate portion 12 consisting of a cross-section of a convex arc; a third bent plate portion 13 consisting of a cross-section of a concave arc; and the fourth bent plate portion 14 consisting of a cross-section of a convex arc. Cross-sections passing the center of the diaphragm 70 and parallel to the sound emission direction of the second bent plate portion 12, the third bent plate portion 13, and the fourth bent plate portion 14 are all arc shapes. Such an arc has a structure dynamically equable at any portions. Therefore, a force inside of the diaphragm 70 generated by the water pressure around the diaphragm 70 acts evenly on the portions of the diaphragm 70, and consequently the force can be dispersed. In the diaphragm 70, the first bent plate portion 11 works mainly as sound emitter. Further, a portion 71 composed of the second bent plate portion 12, the third bent plate portion 13, the fourth bent plate portion 14, and a flat ring portion 18 positioned outside thereof works mainly as edge. Further, in the diaphragm 70 of this embodiment, the first slope portion 15, the second slope portion 16, and the third slope portion 17 shown in FIGS. 5 and 6 are not included, and the first bent plate portion 11, the second bent plate portion 12, the third bent plate portion 13, and the fourth bent plate portion 14 are connected sequentially.

Because the diaphragm 70 has such concave and convex shapes, the water resistance with respect to strength is further improved. Specifically, as an example, the second bent plate portion 12, the third bent plate portion 13, and the fourth bent plate portion 14 are partially hard to be deformed by specific pressure of the water stream, and even if deformed temporarily, they can return to predetermined shapes.

Incidentally, the aforementioned two embodiments merely show typical forms, and the present invention is not limited to these embodiments. Namely, a skilled person can implement in various modifications without departing from the scope of the present invention according to conventional common knowledge. Even if modified as such, as long as it is provided with a configuration of a speaker device of the present invention, it is included in the scope of the present invention.

For example, in the aforementioned first and second embodiments, as an example of the diaphragm of the present invention, the diaphragms 10, 70 are illustrated, in which the curvature radius R11 of the first bent plate portion 11, the curvature radius R12 of the second bent plate portion 12, the curvature radius R13 of the third bent plate portion 13, and the curvature radius R14 of the fourth bent plate portion 14 have the following magnitude relationship. Namely, the curvature radius R11 of the first bent plate portion 11 is larger than the curvature radius R13 of the third bent plate portion 13, and the curvature radius R14 of the fourth bent plate portion 14 is smaller than the curvature radius R12 of the second bent plate portion 12, and further, the curvature radius R12 of the second bent plate portion 12 is smaller than the curvature radius R13 of the third bent plate portion 13. However, the diaphragm of the present invention is not limited to this, and the magnitude relationship among the curvature radii of the four bent plate portions may be different from the above. However, as described above, in the speaker device, owing to the above magnitude relationship among the curvature radii of the four bent plate portions, the anti-resonance frequencies are shifted to the high frequency side, and the reproduction sound pressure of the desired low frequency sound is further prevented from being reduced.

REFERENCE SIGNS LIST 1 speaker device
10, 70 diaphragm
10a opening
10b outer peripheral edge
13 opening
11 first bent plate portion
12 second bent plate portion
13 third bent plate portion
14 fourth bent plate portion
20 frame
30 damper
40 voice coil
50 magnetic circuit
R11 curvature radius of the first bent plate portion
R12 curvature radius of the second bent plate portion
R13 curvature radius of the third bent plate portion
R14 curvature radius of the fourth bent plate portion

The invention claimed is:

1. A speaker device, comprising:
a diaphragm formed of a film containing polyimide; and
a frame for supporting the diaphragm,
wherein a cross-section of the diaphragm passing the center of the diaphragm and parallel to a sound emission direction includes sequentially from an inner periphery to an outer periphery of the diaphragm along the sound emission direction:
a first bent plate portion formed by a concave arc shape;
a second bent plate portion formed by a convex arc shape;
a third bent plate portion formed by a concave arc shape; and
a fourth bent plate portion formed by a convex arc shape, and
wherein an area of the first bent plate portion is larger than any of areas of the second, the third, the fourth bent plate portions, and
wherein:
a radius of curvature of the concave arc shape forming the first bent plate portion is larger than a radius of curvature of the concave arc shape forming the third bent plate portion, and
a radius of curvature of the convex arc shape forming the second bent plate portion is smaller than the radius of curvature of the concave arc shape forming the third bent plate portion.

2. The speaker device as claimed in claim 1, wherein the cross-section of the diaphragm includes:
a cross-section of the convex arc shape forming the second bent plate portion;
a cross-section of the concave arc shape forming the third bent plate portion; and
a cross-section of the convex arc shape forming the fourth bent plate portion.

3. The speaker device as claimed in claim 1, wherein an opening is provided in the center of the first bent plate portion, and the opening is covered with a cap, and
wherein a cross-section of the cap passing the center of the diaphragm and parallel to the sound emission direction is a concave arc.

4. The speaker device as claimed in claim 3, wherein the cap is formed of a film containing polyimide.

5. The speaker device as claimed in claim 3, wherein a radius of curvature of the arc of the cap is smaller than the radius of curvature of the concave arc shape forming the first bent plate portion.

6. The speaker device as claimed in claim 1, wherein the diaphragm has a thickness of one of 50 μm, 75 μm, 100 μm, and 125 μm.

7. The speaker device as claimed in claim 1, wherein the diaphragm has a thickness of 125 μm.

8. The speaker device as claimed in claim 1, wherein the diaphragm is arranged in a vehicle, and generates a warning sound to warn an approach of the vehicle toward an outside of the vehicle.

* * * * *